US011351484B2

United States Patent
Malgorn et al.

(10) Patent No.: US 11,351,484 B2
(45) Date of Patent: *Jun. 7, 2022

(54) SPIN-ON FILTER FOR SUCTION-SIDE AND PRESSURE-SIDE APPLICATIONS IN FILTRATION SYSTEMS

(71) Applicant: Cummins Filtration IP, Inc., Columbus, IN (US)

(72) Inventors: Gérard Malgorn, Quimper (FR); Gauthier Mestdag, Plogastel-Saint-Germain (FR); Pierrick Bonzi, Tregunc (FR); Arnaud Le Ven, Ergue-Gaberic (FR); Stéphane Simon, Guengat (FR); Loïck Menez, Fouesnant (FR)

(73) Assignee: CUMMINS FILTRATION IP, INC., Columbus, IN (US)

( * ) Notice: Subject to any disclaimer, the term of this patent is extended or adjusted under 35 U.S.C. 154(b) by 49 days.

This patent is subject to a terminal disclaimer.

(21) Appl. No.: 16/893,002

(22) Filed: Jun. 4, 2020

(65) Prior Publication Data

US 2020/0298147 A1 Sep. 24, 2020

Related U.S. Application Data

(63) Continuation of application No. 15/517,319, filed as application No. PCT/US2015/054652 on Oct. 8, 2015, now Pat. No. 10,710,008.

(30) Foreign Application Priority Data

Oct. 13, 2014 (FR) .................................... 1459797

(51) Int. Cl.
*B01D 29/11* (2006.01)
*B01D 35/30* (2006.01)

(52) U.S. Cl.
CPC .............. *B01D 29/11* (2013.01); *B01D 35/30* (2013.01); *B01D 2201/291* (2013.01);
(Continued)

(58) Field of Classification Search
CPC ...... B01D 35/306; B01D 35/30; B01D 35/16; B01D 29/21; B01D 29/111; B01D 27/08;
(Continued)

(56) References Cited

U.S. PATENT DOCUMENTS 4,276,161 A 6/1981 Matsui et al.
4,832,844 A 5/1989 Ayers
(Continued)

FOREIGN PATENT DOCUMENTS

CN 1657135 A 8/2005
CN 1901983 A 1/2007
(Continued)

OTHER PUBLICATIONS

First Office Action for Chinese Patent App. No. 201580052728.1 dated Jul. 18, 2018, 21 pages (with translation).
(Continued)

*Primary Examiner* — Waqaas Ali
(74) *Attorney, Agent, or Firm* — Foley & Lardner LLP

(57) ABSTRACT

A Spin-on filter assembly that can be used with both suction-side and pressure-side filtration systems is described. The filter assembly screws onto a filter mounting head. The filter mounting head is part of a filtration system that provides fluid to be filtered to the filter assembly. The filter assembly filters the fluid to be filtered through a filter media contained within the filter assembly and provides the filtered fluid back to the filter mounting head. The filter assembly includes an upper seal that seals the clean side of the filter media from the dirty side of the filter media when the filter assembly is connected to the filter mounting head (Continued)

in an installed position. The upper seal includes a sealing ridge that has an elongated shape and is flexible such that the filter assembly can be used on both pressure-side and suction side applications in filtration systems.

20 Claims, 6 Drawing Sheets

(52) U.S. Cl.
CPC .... *B01D 2201/304* (2013.01); *B01D 2201/34* (2013.01); *B01D 2201/342* (2013.01); *B01D 2201/347* (2013.01)

(58) Field of Classification Search
CPC .............................. B01D 29/13; B01D 35/005; B01D 2201/347; B01D 2201/303; B01D 2201/34; B01D 2201/295; B01D 2201/304; B01D 2201/4007; B01D 53/30
See application file for complete search history.

(56) References Cited

U.S. PATENT DOCUMENTS

| | | | |
|---|---|---|---|
| 4,863,599 | A | 9/1989 | Guenther et al. |
| 5,685,985 | A | 11/1997 | Brown et al. |
| 6,019,229 | A | 2/2000 | Rao |
| 6,045,693 | A | 4/2000 | Miller et al. |
| 6,554,140 | B2 | 4/2003 | Steger et al. |
| 7,763,170 | B2 | 7/2010 | Bassett et al. |
| 8,827,084 | B2 | 9/2014 | Zhu et al. |
| 10,710,008 | B2 * | 7/2020 | Malgorn ................ B01D 35/30 |
| 2004/0118764 | A1 | 6/2004 | Miller et al. |
| 2005/0252841 | A1 | 11/2005 | Bassett et al. |
| 2008/0237113 | A1 | 10/2008 | Jensen |
| 2009/0020470 | A1 | 1/2009 | Bassett et al. |
| 2009/0127198 | A1 | 5/2009 | Salvador et al. |
| 2010/0044303 | A1 | 2/2010 | Perrault et al. |
| 2010/0288687 | A1 | 11/2010 | Bassett et al. |
| 2011/0132828 | A1 | 6/2011 | Ries et al. |
| 2011/0303604 | A1 | 12/2011 | McKenzie |
| 2013/0056409 | A1 | 3/2013 | Sawant et al. |

FOREIGN PATENT DOCUMENTS

| | | |
|---|---|---|
| CN | 103764249 A | 4/2014 |
| EP | 2 368 615 A1 | 9/2011 |
| EP | 2 481 460 A1 | 8/2012 |
| WO | WO-98/19767 A1 | 5/1998 |
| WO | WO-2006/078587 A2 | 7/2006 |
| WO | WO-2010/049208 A1 | 5/2010 |

OTHER PUBLICATIONS

International Search Report & Written Opinion for PCT/US2015/054652 dated Feb. 2, 2016, 12 pages.
Office Action for French Patent App. No. 1459797 dated Jan. 17, 2019, 7 pages (with translation).
Preliminary Search Report & Written Opinion for French Patent App. No. 1459797 dated Jun. 11, 2015, 13 pages (with translation).

* cited by examiner

SPIN-ON FILTER FOR SUCTION-SIDE AND PRESSURE-SIDE APPLICATIONS IN FILTRATION SYSTEMS

CROSS REFERENCE TO RELATED APPLICATIONS

The present application is continuation of U.S. patent Application Ser. No. 15/517,319, filed Apr. 6, 2017, which is a National Stage of PCT Application No. PCT/US2015/054652, filed Oct. 8, 2015, which claims the benefit of and priority to French Patent Application No. 1459797, filed Oct. 13, 2014. The contents of these applications are herein incorporated by reference in their entirety.

TECHNICAL FIELD

The present disclosure relates generally to a spin-on filter for use in fluid filtration, such as oil or fuel filtration, for an internal combustion engine.

BACKGROUND

Fluid filtration systems are used to provide clean fluid to a device. For example, internal combustion engines may have multiple filtration systems to provide clean fuel, clean oil, and clean hydraulic fluid to the various components of the internal combustion engines. Each filtration system generally includes a filter element having a filter media that filters the fluid. Some filtration systems, such as fuel and oil filtration systems, often use spin on filter assemblies. The spin on filter assemblies house the filter element and are "spun on" to a filter mounting head to attach the filter assembly to the filtration systems.

Depending on the arrangement of the filtration system, the filter element may be positioned on a suction side of the filtration system (e.g., in a vacuum assisted filtration system, upstream of a pump that pumps the fluid to be filtered, etc.) or on a pressure side of the filtration system (e.g., downstream of a pump that pumps the fluid to be filtered). The different pressure arrangements can require different seal arrangements. Accordingly, technicians are often required to keep multiple different replacement filter elements having different seal arrangements to service the differently arranged filtration systems.

SUMMARY

One embodiment relates to a filter assembly. The filter assembly includes a housing having an open end and a closed end. A filter element is positioned within the housing and is configured to filter a fluid. The filter assembly further includes an endcap positioned adjacent to the open end of the housing. The end cap is coupled to a first end of the filter element. The filter assembly includes a seal coupled to the endcap and configured to seal a clean side of the filter element from a dirty side of the filter element when the filter assembly is connected in an installed position to a filter mounting head of a filtration system. The seal is configured to seal against the filter mounting head in both suction-side applications and pressure-side applications in filtration systems.

Another embodiment relates to a filtration system. The filtration system includes a filter mounting head including a circumferential groove and a filter housing coupled to the filter mounting head through a threaded connection. The filter housing having an open end and a closed end. A filter element is positioned within the housing and is configured to filter a fluid. the filter element is positioned in a pressure-side application within the filtration system. The filtration system further includes an endcap positioned adjacent to the open end of the housing. The end cap is coupled to a first end of the filter element. The filtration system includes a seal coupled to the endcap and configured to seal a clean side of the filter element from a dirty side of the filter element. The seal includes an outer sealing ridge that at least partially engages the circumferential groove. A pressure of the fluid flowing through the filtration system bends the outer sealing ridge against an outer surface of the circumferential groove to form a seal.

Yet another embodiment relates to a filtration system. The filtration system includes a filter mounting head including a circumferential groove and a filter housing coupled to the filter mounting head through a threaded connection. The filter housing having an open end and a closed end. A filter element is positioned within the housing and is configured to filter a fluid. the filter element is positioned in a suction-side application within the filtration system. The filtration system further includes an endcap positioned adjacent to the open end of the housing. The end cap is coupled to a first end of the filter element. The filtration system includes a seal coupled to the endcap and configured to seal a clean side of the filter element from a dirty side of the filter element. The seal includes an outer sealing ridge that at least partially engages the circumferential groove. A pressure of the fluid flowing through the filtration system bends the outer sealing ridge against an inner surface of the circumferential groove to form a seal.

These and other features, together with the organization and manner of operation thereof, will become apparent from the following detailed description when taken in conjunction with the accompanying drawings, wherein like elements have like numerals throughout the several drawings described below.

DETAILED DESCRIPTION

Referring generally to the figures, a spin-on filter assembly is shown and described. The filter assembly screws onto a filter mounting head. The filter mounting head is part of a filtration system that provides fluid to be filtered to the filter assembly. The filter assembly filters the fluid to be filtered through a filter media contained within the filter assembly and provides the filtered fluid back to the filter mounting head. The filter assembly includes a seal that seals the clean side of the filter media from the dirty side of the filter media when the filter assembly is connected to the filter mounting head in an installed position. The seal includes a sealing ridge that has an elongated shape and is flexible such that the filter assembly can be used on both pressure-side and suction side applications in filtration systems.

Figure 1:
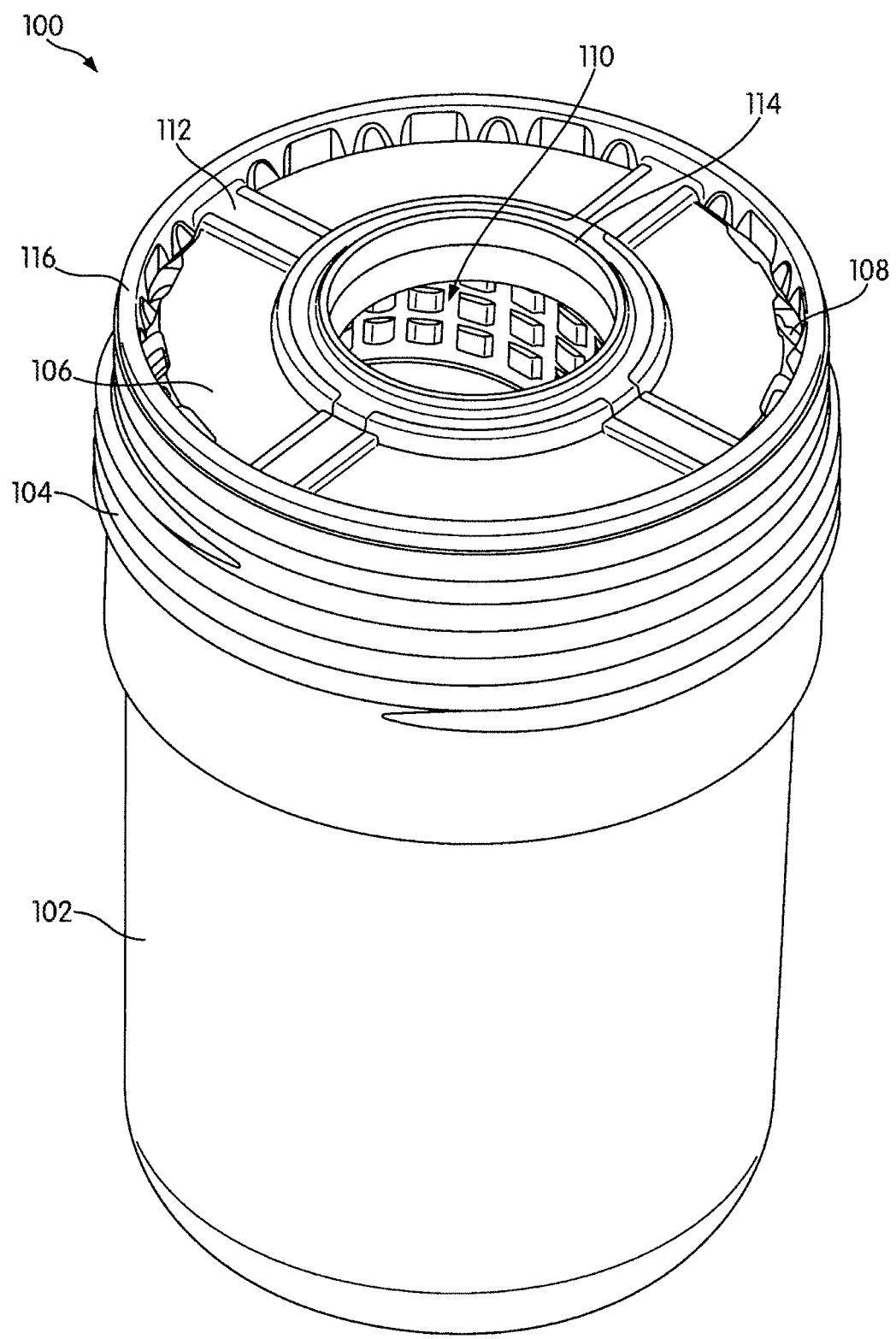
FIG. 1 is a perspective view of a spin-on filter assembly according to an exemplary embodiment.

Referring to FIG. 1, a perspective view of a spin-on filter assembly 100 is shown according to an exemplary embodiment. The filter assembly 100 is shown in an uninstalled position (e.g., not attached to a filter mounting head). The filter assembly 100 includes a housing 102 having an open top end and a closed bottom end. The housing 102 is a shell housing having a generally cylindrical shape. The housing 102 includes a threaded section 104 on an exterior surface of the housing and adjacent to the open top end. As described in further detail below, a filter element 202 is positioned within the housing 102. The filter element 202 is configured to filter a fluid (e.g., fuel, oil, hydraulic fluid, water, etc.). A top end of the filter element 202 is sealed by a bottom surface of an endcap 106 that is coupled to the filter element 202. The endcap 106 is positioned adjacent to the open end of the housing 102. The endcap 106 includes a plurality of circumferential openings 108 and a central opening 110. The top end of the filter element 202 is positioned between the circumferential openings 108 and the central opening 110 such that fluid passing through the filter assembly 100 is forced to pass through the filter element 202. In some arrangements, the circumferential openings 108 are inlet openings (e.g., openings that receive fluid to be filtered), and the central opening 110 is an outlet opening (e.g., openings that provides filtered fluid to a component, such as an internal combustion engine). In other arrangements, the central opening 110 is an inlet opening, and the circumferential openings 108 are outlet openings.

Figure 3:
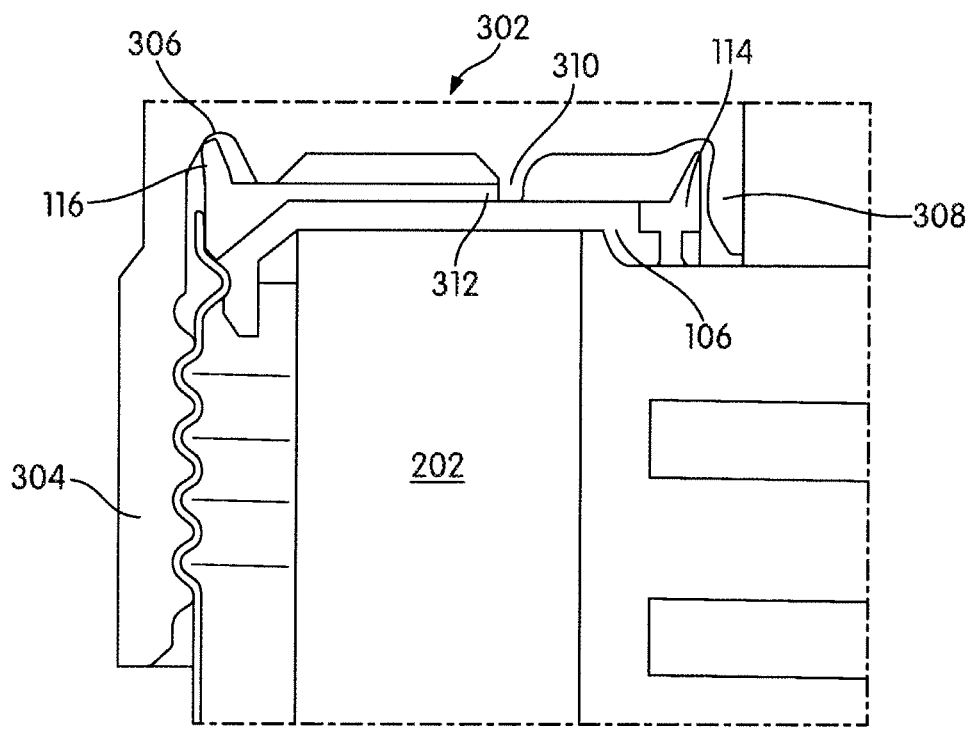
FIG. 3 is a close-up cross-sectional view of the filter assembly of FIG. 1 installed on a filter mounting head.
Figure 4:
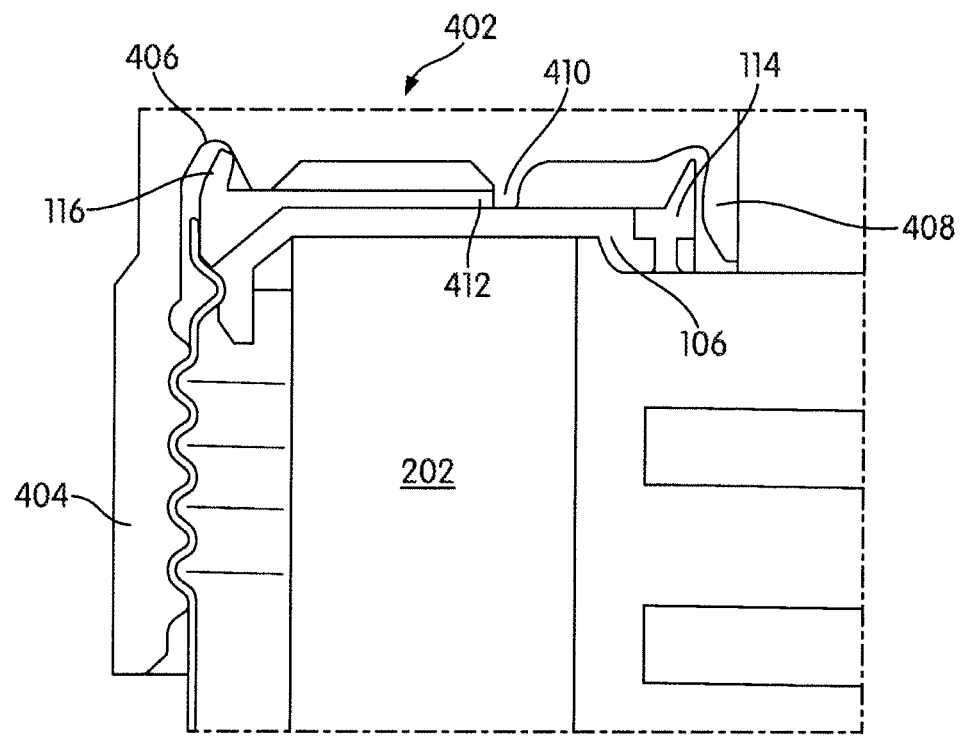
FIG. 4 is a close-up cross-sectional view of the filter assembly of FIG. 1 installed on a different filter mounting head than the filter head depicted in FIG. 3.

The filter assembly 100 includes an upper seal 112. The upper seal 112 is coupled to a top surface of the endcap 106. The top surface of the endcap 106 is opposite the bottom surface of the endcap 106. The upper seal 112 includes an inner sealing ridge 114 and an outer sealing ridge 116. The inner sealing ridge 114 is positioned between the central opening and the circumferential openings on the top surface of the endcap 106. The inner sealing ridge 114 is adjacent to the central opening 110. In some arrangements, the inner sealing ridge 114 and the outer sealing ridge 116 are two separate seals. The inner and outer sealing ridges 114 and 116 seal against a filter mounting head (e.g., filter mounting head 302 as shown in FIG. 3, filter mounting head 402 as shown in FIG. 4, etc.). The upper seal 112 seals a clean side of the filter element 202 from a dirty side of the filter element 202 when the filter element 100 is connected in an installed position to a filter mounting head. As described in further detail below with respect to FIGS. 3 and 4, the upper seal 112 is configured to properly seal the against the filter mounting head in both suction-side and pressure-side applications in filtration systems. A suction-side application in filtration system refers to the filter assembly 100 being positioned in a filtration system that uses a negative pressure to draw fluid through the filter assembly 100. The negative pressure may be caused by a vacuum or a pump positioned downstream of the filter assembly 100. A pressure-side application in a filtration system refers to the filter assembly being positioned in a filtration system that uses a positive pressure to push fluid through the filter assembly 100. The positive pressure may be caused by a pump positioned upstream of the filter assembly 100. The outer sealing ridge 116 is elongated and flexible, which allows the upper seal 112 to properly seal in both pressure-side and suction side applications within filtration systems.

Figure 2:
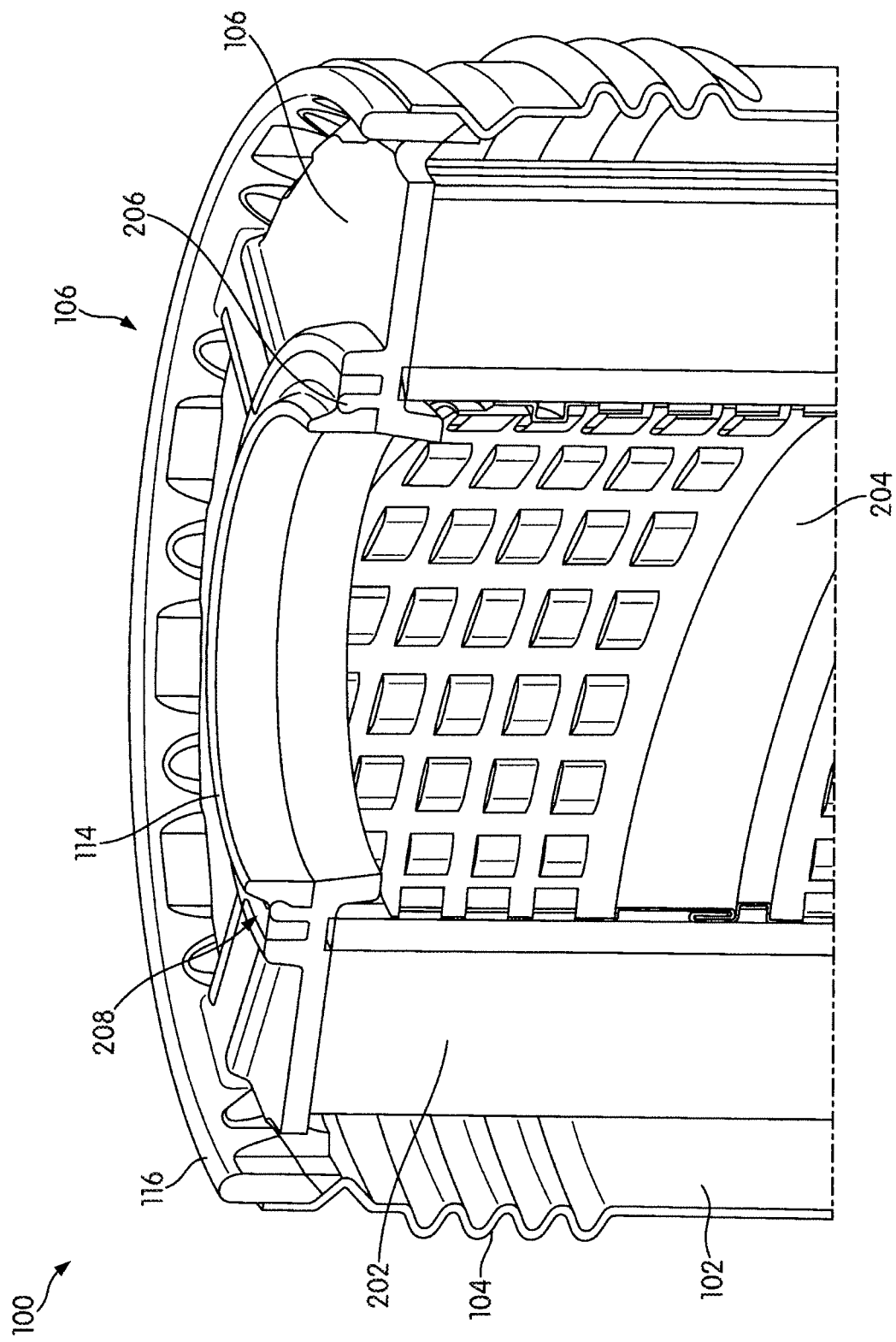
FIG. 2 is a cross-sectional view of an upper portion of the filter assembly of FIG. 1.

Referring to FIG. 2, a cross-sectional view of an upper portion of the filter assembly 100 is shown. The filter element 202 includes filter media that is suitable for filtering the fluid with which the filter assembly 100 will be used. The filter media may be pleated filter media (e.g., pleated cellulose filter media), non-pleated filter media, or the like. The filter element 202 depicted in FIG. 2 is generally cylindrical in shape (although other shapes may be possible) and has an open center region. The open center region is supported by a support core 204. The support core 204 helps to prevent the filter element 202 from collapsing under the pressure of the fluid as the fluid flows through the filter media. In some arrangements, the upper seal 112 is connected to the endcap 106 through a snap-fit connection. In such arrangements, the endplate includes a snap projection 206 that is received in a snap opening 208 of the upper seal 112 when the upper seal is connected to the endcap 106. In alternative arrangements, the upper seal 112 is molded into the endcap 106 or adhered to the endcap with adhesive.

Referring to FIG. 3, a close-up cross-sectional view of the filter assembly 100 installed on a filter mounting head 302 is shown. The filter assembly 100 is in the installed position on the filter mounting head 302. The filter mounting head 302 is part of a filtration system that supplies filtered fluid (e.g., fuel, oil, hydraulic fluid, etc.) to a device, such as an internal combustion engine. In the filtration system of FIG. 3, the filter assembly 100 is positioned in a pressure-side application. The filter mounting head 302 includes a threaded portion 304 that mates with the threaded portion 104 of the housing 102. When the filter assembly 100 is screwed onto the filter mounting head 302, the filter mounting head 302 interacts with the upper seal 112 to seal the clean side of the filter element 202 from the dirty side of the filter element 202.

The filter mounting head 302 includes a circumferential outer groove 306 that at least partially receives the outer sealing ridge 116 of the upper seal 112 when the filter assembly 100 is in the installed position. The outer groove 306 is larger than the outer sealing ridge 116. Since the outer sealing ridge 116 is elongated and flexible, the outer sealing ridge 116 can bend to press and seal against either an inside surface or an outside surface of the outer groove 306. Because the filter assembly 100 is positioned in a pressure-side application, the pressure of the fluid flowing through the filter assembly 100 bends the outer sealing ridge 116 against the outer surface of the outer groove 306 (e.g., the outer sealing ridge 116 bends radially outwardly from the pressure of the fluid). The pressure of the fluid against the outer sealing ridge 116 causes good contact pressure between the outer sealing ridge 116 and the outside surface of the outer groove 306. Accordingly, the outer sealing ridge 116 creates a cylindrical contact seal with the outside surface of the outer groove 306. The filter mounting head 302 further includes an inner sealing wall 308. The inner sealing wall 308 seals against the inner sealing ridge 114 when the filter assembly 100 is in the installed position. In some arrangements, a middle projection 310 rests against an elevated edge 312 of the upper seal 112.

Referring to FIG. 4, a close-up cross-sectional view of the filter assembly 100 installed on a filter mounting head 402 is shown. The filter assembly 100 is in the installed position on the filter mounting head 402. The filter mounting head 402 is similar to the filter mounting head 302 of FIG. 3. However, the filter mounting head 402 is positioned in a suction side application on the filtration system, not in a pressure-side application as is the filter mounting head 302. The filter mounting head 402 includes a threaded portion 404 that mates with the threaded portion 104 of the housing 102. When the filter assembly 100 is screwed onto the filter mounting head 402, the filter mounting head 402 interacts with the upper seal 112 to seal the clean side of the filter element 202 from the dirty side of the filter element 202.

The filter mounting head 402 includes an outer groove 406 that receives the outer sealing ridge 116 of the upper seal 112 when the filter assembly 100 is in the installed position. The outer groove 406 is larger than the outer sealing ridge 116. Since the outer sealing ridge 116 is elongated and flexible, the outer sealing ridge 116 can bend to press and seal against either an inside surface or an outside surface of the outer groove 406. Because the filter assembly 100 is positioned in a suction-side application, the pressure of the fluid flowing through the filter assembly 100 bends the outer sealing ridge 116 against the inner surface of the outer groove 406 (e.g., the outer sealing ridge 116 bends radially inwardly from the pressure of the fluid). The pressure of the fluid against the outer sealing ridge 116 causes good contact pressure between the outer sealing ridge 116 and the inner surface of the outer groove 406. Accordingly, the outer sealing ridge 116 creates a cylindrical contact seal with the outside surface of the outer groove 406. The filter mounting head 402 further includes an inner sealing wall 408. The inner sealing wall 408 seals against the inner sealing ridge 114 when the filter assembly 100 is in the installed position. In some arrangements, a middle projection 410 rests against an elevated edge 412 of the upper seal 112.

Since the outer sealing ridge 116 is elongated and flexible, the upper seal 112 can be used with both pressure-side and suction-side applications in filtration systems. The design of the outer sealing ridge 116 eliminates the need for service technicians to carry separate filter assemblies for pressure-side applications and for suction-side applications. Additionally, the use of a single type of spin-on filter assembly for both types of applications reduces the likelihood that a service technician replaces a filter assembly with the wrong type of filter assembly (e.g., reduces the chance that a service technician places a pressure-side specific filter in a suction-side application).

Figure 5:
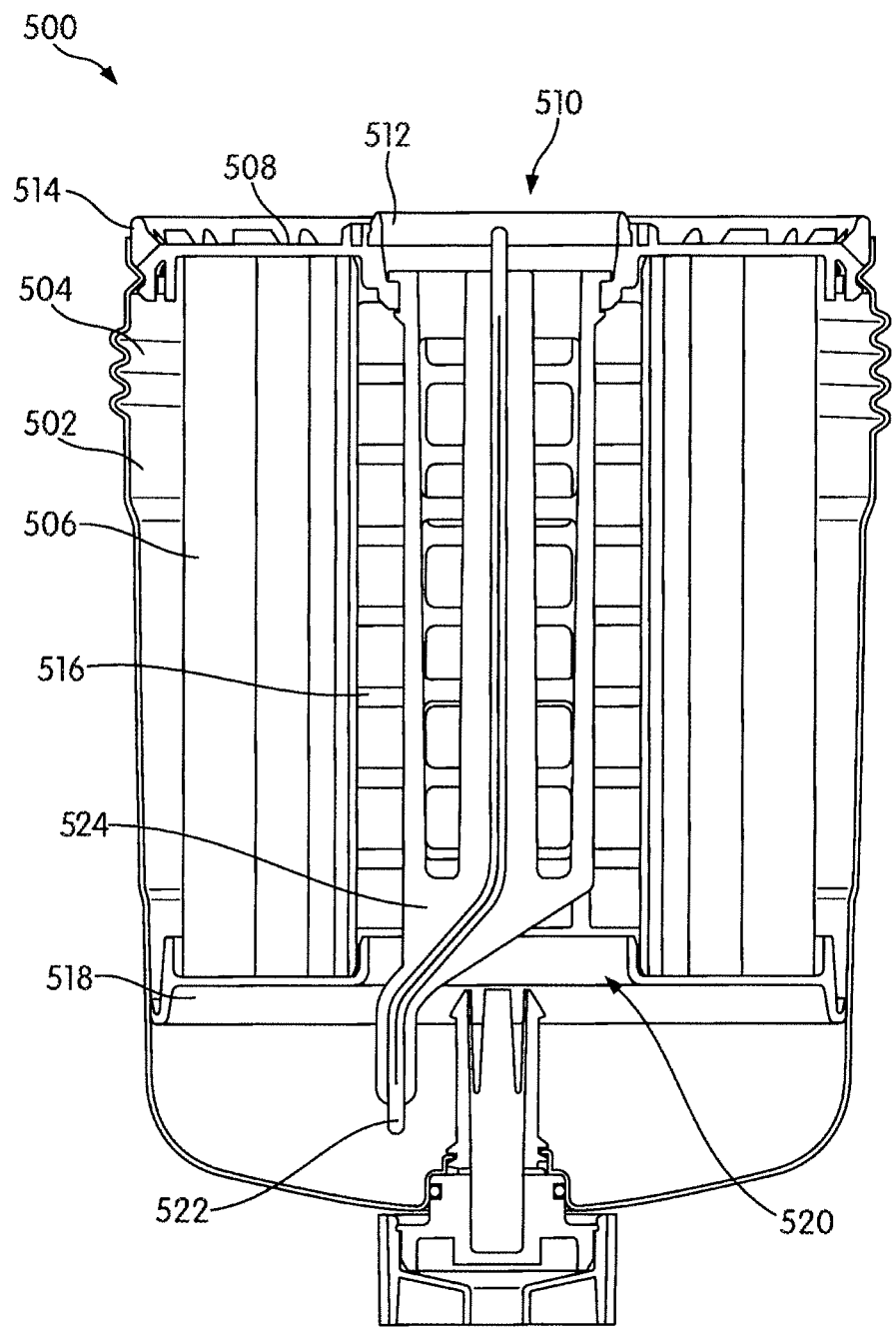
FIG. 5 is a cross-sectional view of a spin-on filter assembly according to another exemplary embodiment.
Figure 6:
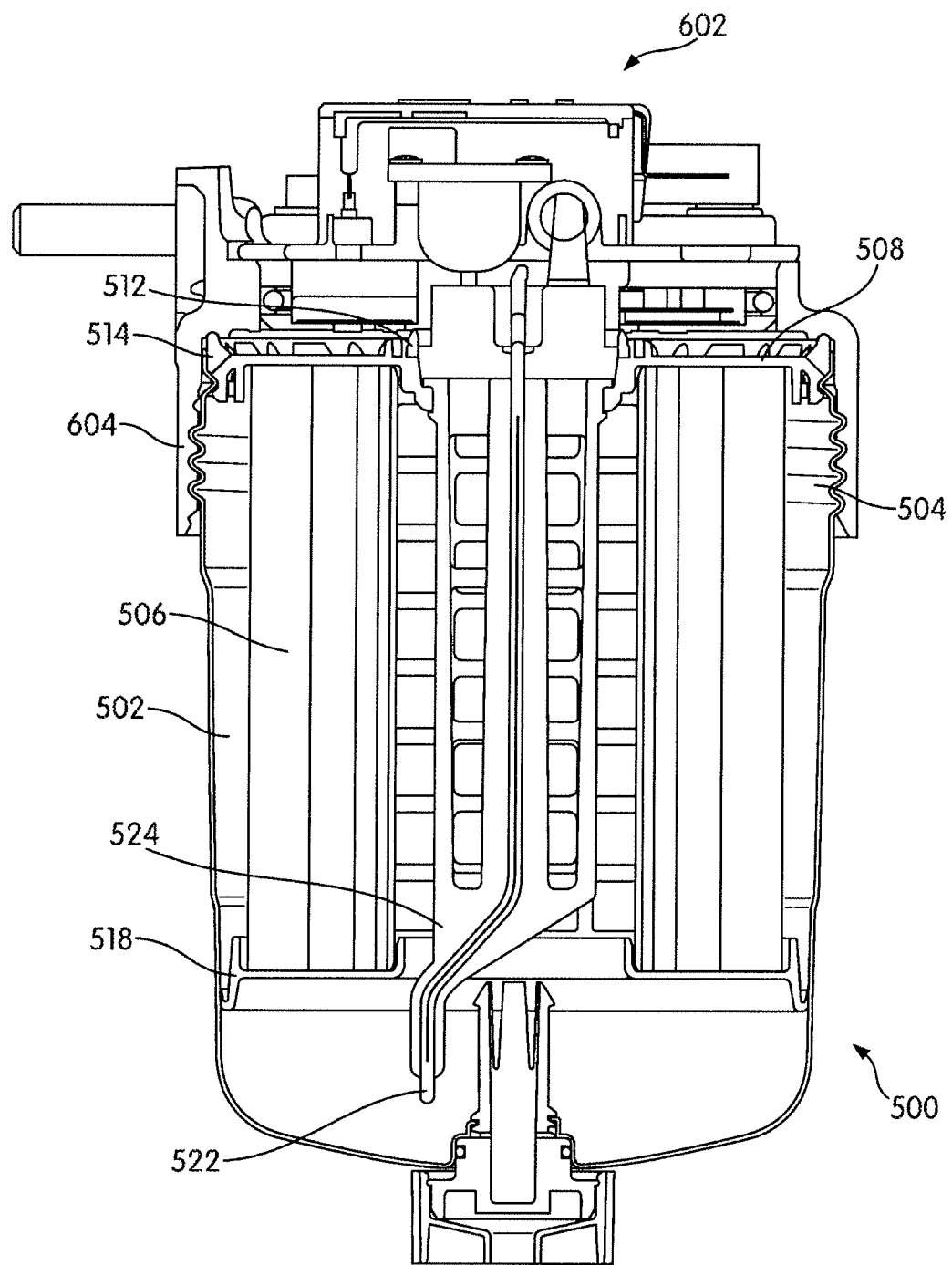
FIG. 6 is a cross-sectional view of the spin-on filter assembly of FIG. 5 installed on a filter mounting head.

Referring to FIG. 5, a cross-sectional view of a spin-on filter assembly 500 is shown according to another exemplary embodiment. The filter assembly 500 is shown in an uninstalled position (e.g., not attached to the filter mounting head 602 as shown in FIG. 6). The filter assembly 500 is similar to the filter assembly 100. The filter assembly 500 a housing 502 having an open top end and a closed bottom end. The housing 502 is a shell housing having a generally cylindrical shape. The housing 502 includes a threaded section 504 on an exterior surface of the housing and adjacent to the open top end. A filter element 506 is positioned within the housing 502. The filter element 506 is configured to filter a fluid (e.g., fuel, oil, hydraulic fluid, water, etc.).

A top end of the filter element 506 is sealed by a bottom surface of a top endcap 508 that is coupled to the filter element 506. The top endcap 508 is positioned adjacent to the open end of the housing 502. The top endcap 508 includes a plurality of circumferential openings (arranged in a similar manner to the circumferential openings 108 of filter assembly 100) and a central opening 510. The top end of the filter element 506 is positioned between the circumferential openings and the central opening 510 such that fluid passing through the filter assembly 500 is forced to pass through the filter element 506. In some arrangements, the circumferential openings are inlet openings (e.g., openings that receive fluid to be filtered), and the central opening 510 is an outlet opening (e.g., openings that provides filtered fluid to a component, such as an internal combustion engine). In other arrangements, the central opening 510 is an inlet opening, and the circumferential openings are outlet openings.

The filter assembly 500 includes an upper seal. The upper seal is coupled to a top surface of the top endcap 508. The top surface of the top endcap 508 is opposite the bottom surface of the top endcap 508. The upper seal includes an inner sealing ridge 512 and an outer sealing ridge 514. The inner sealing ridge 512 is positioned between the central opening 510 and the circumferential openings on the top surface of the top endcap 508. The inner sealing ridge 512 is adjacent to the central opening 510. In some arrangements, the inner sealing ridge 512 and the outer sealing ridge 514 are two separate seals. The inner and outer sealing ridges 512 and 514 seal against a filter mounting head (e.g., filter mounting head 602 as shown in FIG. 6). The upper seal seals a clean side of the filter element 506 from a dirty side of the filter element 506 when the filter element 500 is connected in an installed position to a filter mounting head. As described above with respect to filter assembly 100 and upper seal 112 with respect to FIGS. 3 and 4, the upper seal of filter assembly 500 is configured to properly seal the against the filter mounting head in both suction-side and pressure-side applications in filtration systems. Accordingly, the outer sealing ridge 514 is elongated and flexible, which allows the upper seal to properly seal in both pressure-side and suction side applications within filtration systems.

The filter element 506 includes filter media that is suitable for filtering the fluid with which the filter assembly 500 will be used. The filter media may be pleated filter media (e.g., pleated cellulose filter media), non-pleated filter media, or the like. In some arrangements, the filter element 506 is a multi-stage filter element (e.g., a two-stage filter element, a three-stage filter element, etc.). The filter element 506 as depicted in FIG. 5 is generally cylindrical in shape (although other shapes may be possible) and has an open center region. The open center region is supported by a support core 516. The support core 516 helps to prevent the filter element 506 from collapsing under the pressure of the fluid as the fluid flows through the filter media. In some arrangements, the upper seal is connected to the top endcap 508 through a snap-fit connection (e.g., in a similar manner as described above with respect to filter assembly 100). In alternative arrangements, the upper seal is molded into the top endcap 508 or adhered to the endcap with adhesive. A bottom end of the filter element 506 is sealed by a top surface of a bottom endcap 518 that is coupled to the filter element 506. The bottom endcap 518 is positioned adjacent to the closed end of the housing 502. The bottom endcap 518 includes a central opening 520. The bottom end of the filter element 506 is sealed by the bottom endcap 518, and the bottom endcap 518 seals against an inner wall of the housing 502 such that fluid passing through the filter assembly 500 is forced to pass through the filter element 506.

The filter assembly 500 includes a water in fuel ("WIF") pin 522 extending through the open center of the filter element 506. The WIF pin 522 forms part of a WIF sensor when the filter assembly 500 is attached to a mounting head of a filtration system that includes a WIF sensor. Water that is separated from the fluid being filtered by the filter element 506 accumulates in a bottom portion of the housing 502. If the water level within the housing 502 reaches the WIF pin 522, the WIF sensor detects a high water level within the housing 502. In some arrangements, a control system in communication with the WIF sensor initiates an alert to an operator of the internal combustion engine (e.g., a dash light may be turned on, an audible alarm may be triggered, etc.)

to indicate that the water needs to be drained. In other arrangements, the control system opens a valve in the housing to drain the accumulated water. The WIF pin 522 is supported by a bracket 524. The bracket 524 is coupled to the top endcap 508.

FIG. 6 shows a cross-sectional view of the spin-on filter assembly 500 installed on a filter mounting head 602. The filter assembly 500 is in the installed position on the filter mounting head 602. The filter mounting head 602 is part of a filtration system that supplies filtered fluid (e.g., fuel, oil, hydraulic fluid, etc.) to a device, such as an internal combustion engine. The filter assembly 500 is positioned in either a pressure-side application or a suction-side application. The filter mounting head 602 includes a threaded portion 604 that mates with the threaded portion 504 of the housing 502. When the filter assembly 500 is screwed onto the filter mounting head 602, the filter mounting head 602 interacts with inner sealing ridge 512 and the outer sealing ridge 514 of the upper seal to seal the clean side of the filter element 506 from the dirty side of the filter element 506.

Figure 7:
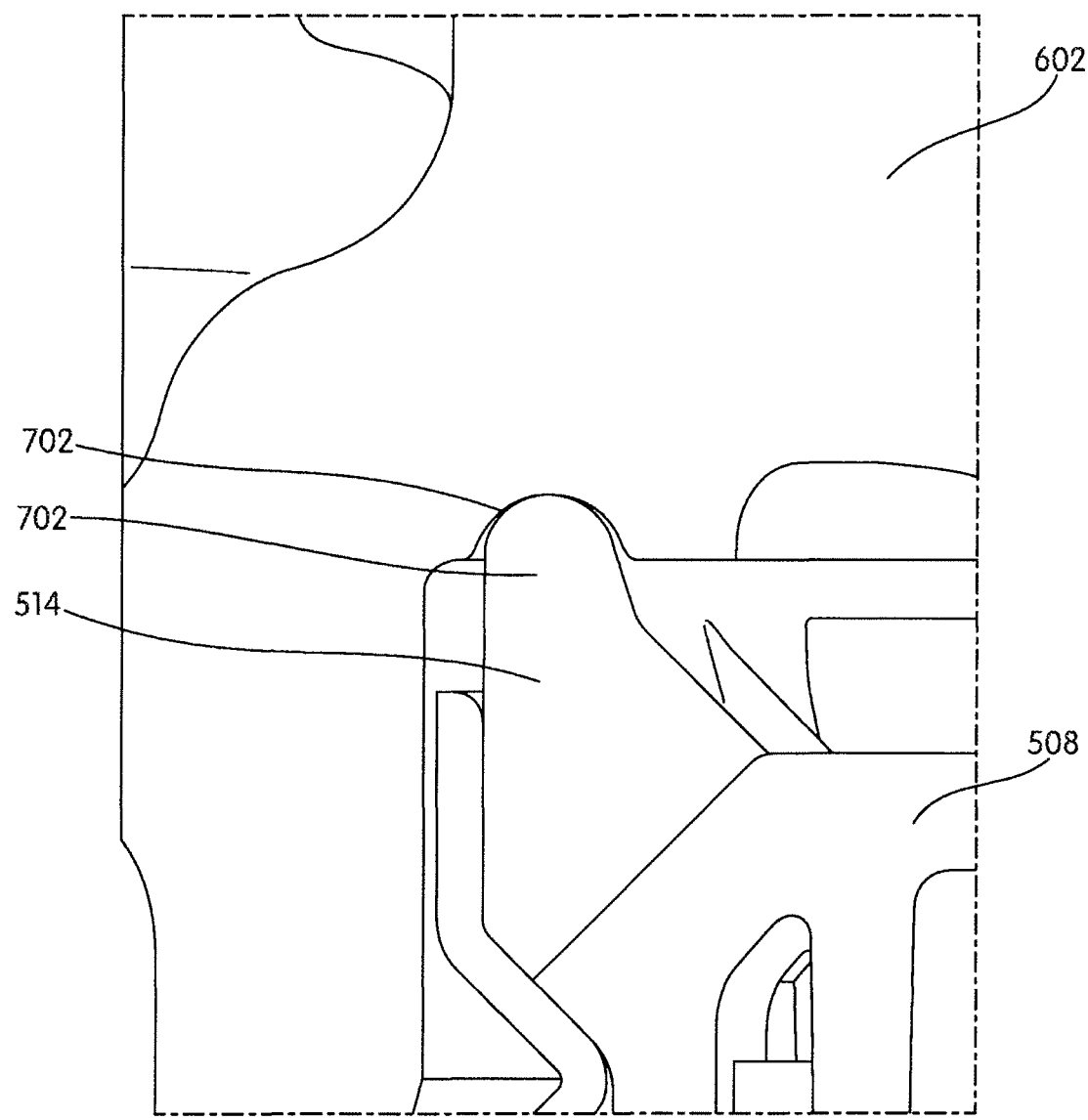
FIG. 7 is a close-up cross-sectional view of the spin-on filter assembly and mounting head of FIG. 6

As shown in FIG. 7, the filter mounting head 602 includes a circumferential outer groove 702 that at least partially receives the outer sealing ridge 514 of the upper seal when the filter assembly 500 is in the installed position. FIG. 7 is a close-up cross sectional view of the filter assembly 500 installed on the mounting head 602. The outer groove 702 is larger than the tip 704 of the outer sealing ridge 514. Since the outer sealing ridge 514 is elongated and flexible, the outer sealing ridge 514 can bend to press and seal against either an inside surface or an outside surface of the outer groove 702 (depending on whether the filter assembly 500 is positioned in a pressure-side application or a suction side application). Accordingly, the outer sealing ridge 514 creates a cylindrical contact seal with the outside surface of the outer groove 702.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A filter assembly comprising:
   a housing having an open end and a closed end, the housing configured to engage with a filter mounting head of a filtration system;
   a filter element positioned within the housing;
   an endcap positioned adjacent to the open end of the housing and coupled to the filter element; and
   a sealing ridge coupled to the endcap, the sealing ridge configured to be received within a circumferential groove in the filter mounting head when the housing is connected in an installed position to the filter mounting head, the sealing ridge repositionable within the circumferential groove in the filter mounting head between a first position in the presence of a negative pressure through the filtration system and a second position in the presence of a positive pressure through the filtration system such that the sealing ridge presses and seals against an inside surface of the circumferential groove in the first position and an outside surface of the circumferential groove separate from the inside surface in the second position.

2. The filter assembly of claim 1, wherein the sealing ridge is configured to bend radially inwardly toward the first position in the presence of the negative pressure, and wherein the sealing ridge is configured to bend radially outwardly toward the second position in the presence of the positive pressure.

3. The filter assembly of claim 1, wherein the sealing ridge is disposed on an upper surface of the endcap, the sealing ridge extending in a circumferential direction along an outer perimeter of the endcap.

4. The filter assembly of claim 1, at least a portion of the sealing ridge extends radially outward from an outer perimeter of the endcap.

5. The filter assembly of claim 1, wherein the sealing ridge is positioned between the endcap and the housing.

6. The filter assembly of claim 1, wherein the sealing ridge defines an outer surface that is parallel to a central axis of the filter element in an unbent neutral position between the first position and the second position.

7. The filter assembly of claim 6, wherein the sealing ridge defines a tip and an inner surface on an opposite side of the tip as the outer surface, the inner surface angled with respect to the outer surface.

8. The filter assembly of claim 1, wherein the endcap comprises a central opening and a circumferential opening, the circumferential opening disposed between the sealing ridge and the central opening.

9. The filter assembly of claim 8, wherein the sealing ridge extends upwardly from the endcap in an axial direction parallel to a central axis of the filter element.

10. The filter assembly of claim 1, wherein the sealing ridge is an outer sealing ridge, and wherein the filter assembly further comprises an inner sealing ridge that is spaced radially apart from the outer sealing ridge by an opening in the endcap.

11. The filter assembly of claim 1, wherein the sealing ridge is in contact with both the endcap and the housing.

12. The filter assembly of claim 10, wherein the opening is a circumferential opening, wherein the filter assembly further comprises a central opening that is spaced radially apart from the circumferential opening by the inner sealing ridge, and wherein the inner sealing ridge is adjacent to the central opening.

13. A filter assembly comprising:
a filter element;
an endcap coupled to a first end of the filter element; and
a sealing ridge coupled to the endcap, the sealing ridge disposed on an upper surface of the endcap, the sealing ridge repositionable between a first position and a second position radially outwardly from the first position such that, when the filter assembly is installed in a filtration system, the sealing ridge moves to the first position in the presence of a negative pressure through the filtration system and the second position in the presence of a positive pressure through the filtration system.

14. The filter assembly of claim 13, wherein the sealing ridge is configured to bend radially inwardly toward the first position in the presence of the negative pressure, and wherein the sealing ridge is configured to bend radially outwardly toward the second position in the presence of the positive pressure.

15. The filter assembly of claim 13, wherein the sealing ridge extends in a circumferential direction along the outer perimeter.

16. The filter assembly of claim 13, further comprising a housing, wherein the filter element is disposed within the housing, and wherein the sealing ridge is positioned between the endcap and the housing.

17. The filter assembly of claim 13, wherein the sealing ridge defines an outer surface that is parallel to the central axis of the filter element in an unbent neutral position between the first position and the second position.

18. The filter assembly of claim 13, wherein the endcap comprises a central opening and a circumferential opening, and wherein the circumferential opening is disposed between the sealing ridge and the central opening.

19. The filter assembly of claim 18, wherein the sealing ridge extends upwardly from the endcap in an axial direction parallel to a central axis of the filter element.

20. The filter assembly of claim 13, wherein the sealing ridge is an outer sealing ridge, and wherein the filter assembly further comprises an inner sealing ridge that is spaced radially apart from the outer sealing ridge by an opening in the endcap.

* * * * *